United States Patent
Kellerman

(10) Patent No.: US 11,002,384 B2
(45) Date of Patent: May 11, 2021

(54) CABLE CONVEYANCE SYSTEM

(71) Applicant: Cablofil, Inc., Mascoutah, IL (US)

(72) Inventor: Dallas Kellerman, Belleville, IL (US)

(73) Assignee: CABLOFIL, INC., Mascoutah, IL (US)

( * ) Notice: Subject to any disclaimer, the term of this patent is extended or adjusted under 35 U.S.C. 154(b) by 58 days.

(21) Appl. No.: 16/543,851

(22) Filed: Aug. 19, 2019

(65) Prior Publication Data
US 2021/0054950 A1 Feb. 25, 2021

(51) Int. Cl.
*F16M 11/00* (2006.01)
*F16L 3/26* (2006.01)
*H02G 3/04* (2006.01)
*F16L 3/10* (2006.01)

(52) U.S. Cl.
CPC ............... *F16L 3/26* (2013.01); *F16L 3/10* (2013.01); *H02G 3/0418* (2013.01); *H02G 3/0437* (2013.01)

(58) Field of Classification Search
CPC ....... H02G 3/0608; H02G 3/0456; F16L 3/26; F16B 7/182
See application file for complete search history.

(56) References Cited

U.S. PATENT DOCUMENTS

| | | | | |
|---|---|---|---|---|
| 3,370,121 A | * | 2/1968 | Merckle | H02G 3/0608 174/373 |
| 4,077,434 A | * | 3/1978 | Sieckert | F16L 23/14 138/92 |
| 4,954,015 A | * | 9/1990 | McGowan | E03F 3/046 405/119 |
| 6,313,405 B1 | * | 11/2001 | Rinderer | H02G 3/0456 174/68.3 |
| 6,855,884 B2 | | 2/2005 | Spagnoli et al. | |
| 7,411,126 B2 | | 8/2008 | Herzog et al. | |
| 9,024,188 B2 | | 5/2015 | Lacey, Jr. et al. | |
| 2015/0311987 A1 | * | 10/2015 | Meyer | H04B 17/23 340/657 |
| 2019/0089141 A1 | * | 3/2019 | Combes | H02G 3/0608 |

* cited by examiner

*Primary Examiner* — Amy J. Sterling
(74) *Attorney, Agent, or Firm* — Bryan Cave Leighton PaisnerLLP

(57) ABSTRACT

A cable conveyance assembly having a primary tray section and a splice, each with a horizontal floor and two vertical sidewalls. Each of the sidewalls of the primary tray section includes a ridge on an exterior surface located proximate the floor of the primary tray section and a lip located distally from the floor extending outwardly and downwardly from each sidewall forming a notch spaced outwardly from the exterior surface of each sidewall. The sidewalls of the splice include a glide channel formed on an interior surface of each sidewall proximate the floor of the splice so that splice may be slideably engaged with the primary tray section such that the ridge of the sidewalls of the primary tray section is aligned with and mates with the glide channel on each sidewall of the splice.

8 Claims, 9 Drawing Sheets

CABLE CONVEYANCE SYSTEM

FIELD OF THE DISCLOSURE

The present disclosure generally relates to cable tray systems for the management and routing of cables.

BACKGROUND

Cable trays or troughs are used to support cables, communication lines, and other wiring which run through, over, and around buildings or other fixed structures, and aid in routing such cables between equipment. The cables may run along surfaces such as walls, floors, and ceilings. The cable routing may take place in concealed or open ceiling areas or in other manners to route the cables from one location to another. Cable trays may have both straight and curved (horizontal, vertical, and/or other angled) sections to accommodate the installation requirements of particular settings.

The cable trays may be affixed to rigid points such as posts, beams, brackets, supports, and the like. Prior art cable routing devices can be easily moved out of place or may sag under the weight of cables carried by the cable routers. Therefore, cable routers that do not possess these and other shortcomings are necessary. A preferred system would include an external splice section that strengthens straight cable tray sections, thus reducing sag or flexing of the sections while expanding support spacing hence reducing costs.

SUMMARY OF THE DISCLOSURE

Among the various aspects of the present disclosure is the provision of a cable conveyance system as substantially shown and described.

Briefly, therefore, one aspect of the disclosure is directed to a cable conveyance assembly having a primary tray section with a horizontal floor and two vertical sidewalls extending upwardly and generally perpendicular to the floor. Each of the sidewalls of the primary tray section includes a ridge on an exterior surface of each sidewall of the primary tray section located proximate the floor of the primary tray section and a lip located distally from the floor of the primary tray section extending outwardly and downwardly from each sidewall forming a notch spaced outwardly from the exterior surface of each sidewall. The assembly may also include one or more generally L-shaped brackets for coupling to the exterior surface of at least one of the sidewalls of the primary tray section. The brackets have a first and a second leg, which can be of equal lengths, wherein the first leg of the bracket includes a glide groove and the second leg of the bracket includes a hold down groove, wherein each groove is sized to slideably engage with the ridge of the sidewalls of the primary tray section. The glide groove is spaced further along a length of the first leg than the hold down groove is spaced along a length of the second leg.

In one configuration, the bracket may be arranged in a glide configuration wherein the first leg extends into the lip of one of the sidewalls of the primary tray section, the ridge of the sidewall is received in the glide groove, and wherein the second leg extends outwardly from the sidewall of the primary tray section. In another configuration, the bracket may be arranged in a hold down configuration wherein the bracket is flipped around such that the second leg extends into the lip of one of the sidewalls of the primary tray section, the ridge of the sidewall is received in the hold down groove, and wherein the first leg extends outwardly from the sidewall of the primary tray section.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

Like reference numerals indicate corresponding parts throughout the several views of the drawings.

DETAILED DESCRIPTION

Figure 1:
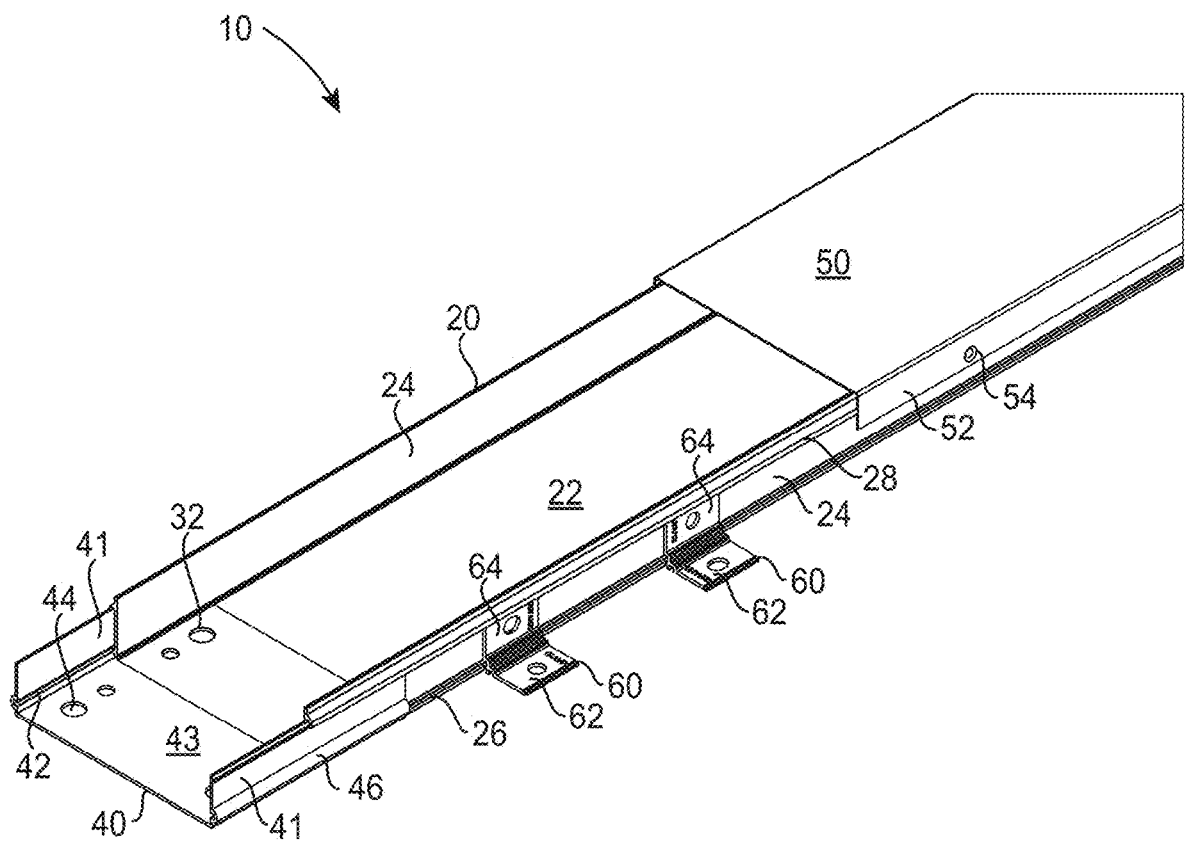
FIG. 1 is a perspective view of a cable conveyance system according to one aspect of the disclosure.
Figure 2:
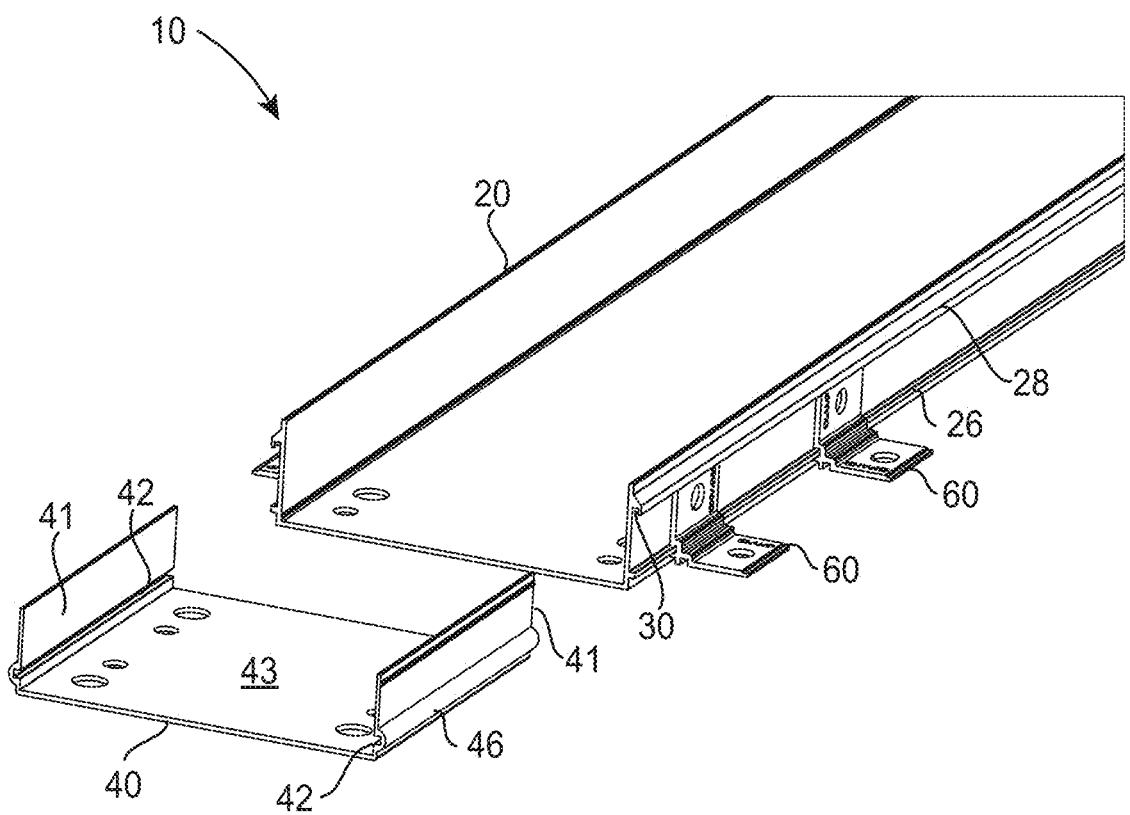
FIG. 2 is another perspective view of a cable conveyance system according to one aspect of the disclosure.

The accompanying figures and this description depict and describe aspects of a cable conveyance system in accordance with the present disclosure, and features and components thereof. It should also be noted that any references herein to front and back, right and left, top and bottom and upper and lower are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Various aspects of the present disclosure are directed to a cable conveyance system for routing cables. With reference to FIGS. 1-9, an aspect of a cable conveyance system 10 is described in detail. Cable conveyance system 10, includes a primary tray section 20 having a floor 22 on which cables routed through the system will rest. At least a portion of floor 22 is substantially horizontal. The primary tray section 20 further includes two sidewalls 24 extending upwardly from, and generally perpendicularly to, the floor 22, forming a trough to retain routed cables. At least one of the sidewalls 24, and preferably both sidewalls, include a ridge 26, located on an exterior surface (i.e., on the side opposite the floor 22) and located proximate to the floor 22 (i.e., closer to the floor that the open top of the primary tray section 20). As best illustrated in FIGS. 5-8, the ridge 26 may be rectangular in shape although other shapes are within the scope of the present invention. At least one of the sidewalls 24, and preferably both sidewalls, includes a lip 28 extending along the length of the sidewall and extending generally outwardly and downwardly from the upper exterior surface of the sidewall 24. This lip 28 forms a notch 30 spaced outwardly from the sidewall 24 for retaining a portion of other components of the cable conveyance system as described below. The primary tray section 20 extends lengthwise in an axial direction and can be of varying lengths and widths, and can be coupled to other tray sections as described below.

The cable conveyance system 10 optionally includes a secondary tray section or splice 40. This splice 40 includes a floor 43 and upwardly extending sidewalls 41. Preferably, the floor 43 is wider in width that the floor 22 of the primary tray section 20. Thus, the primary tray section 20 may slide within the splice 40. To aid in this arrangement, the splice 40 may include a glide channel 42 formed in the interior surface of the sidewalls 41. Preferably, the glide channel 42 is shaped to receive the ridge 26 on the exterior surface of the sidewalls 24 of the primary tray section 20. Formation of the glide channel 42 may result in a protrusion 46 of the exterior surface of the sidewalls 41 of the splice 40. The primary tray section and splice 40 may include apertures or holes 32 and 44, which may be aligned for receipt of a pin, screw, or other attachment means such that the primary tray section 20 may be fixed to the splice 40. The end of the splice 40 opposite the primary tray section 20 may be coupled in a similar fashion to another primary tray section thus increasing the overall length of the cable conveyance system 10 while reducing the potential for lag or flexing due to the weight of the cables.

The cable conveyance system 10 optionally includes a cover 50 that may rest on, snap fit to, or otherwise be attached or coupled to the primary tray section 20. The cover 50 may extend along the length of the primary tray section 20, or cover a portion thereof, or, alternatively, cover all or a portion of the secondary tray section 40.

The components of the cable conveyance system 10 may be formed from a variety of materials including metals such as aluminum, or polymeric materials. The components may or may not all be made of the same material.

Figure 3:
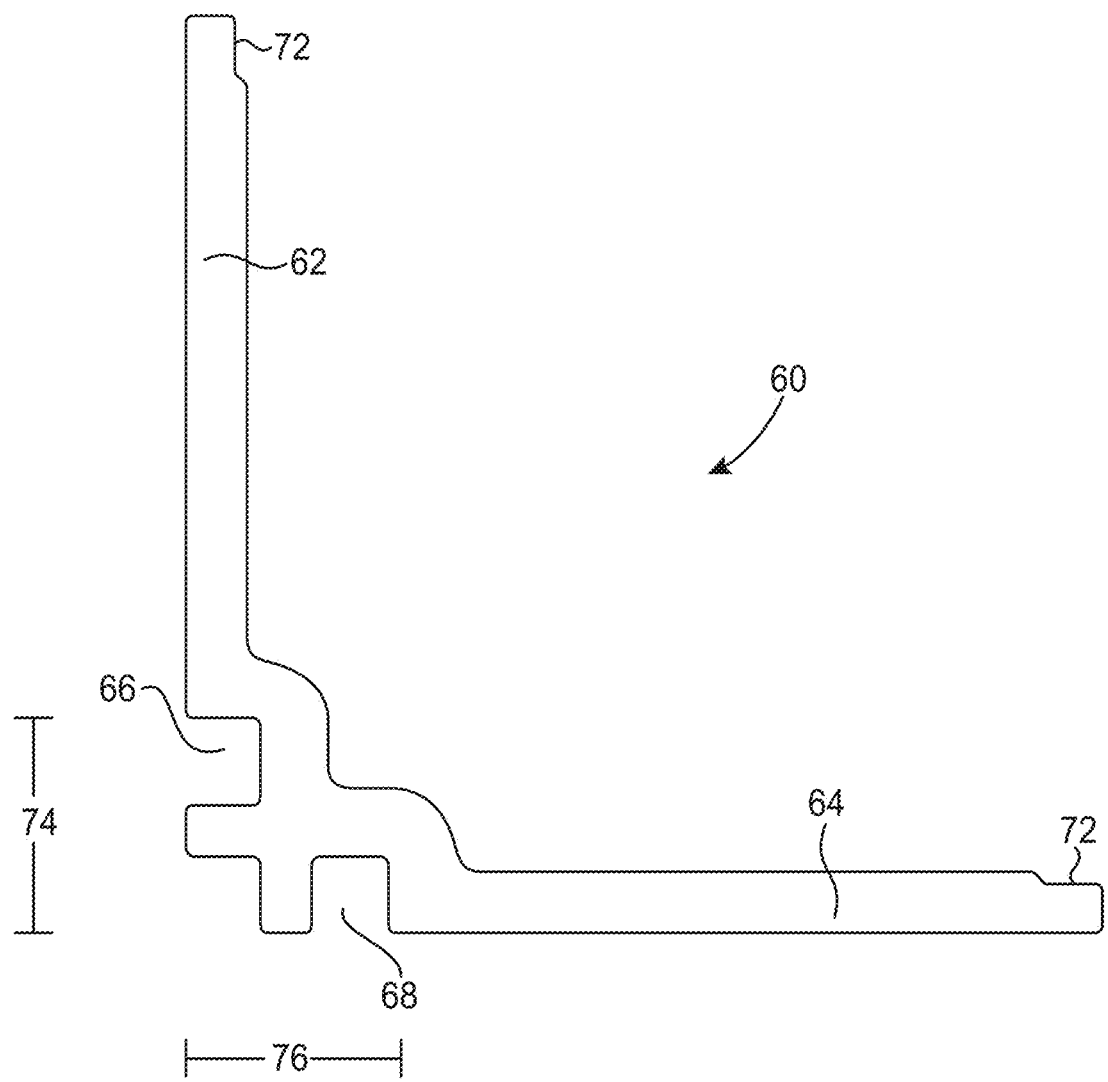
FIG. 3 is an end view of a bracket used with the cable conveyance system according to one aspect of the disclosure.
Figure 4:
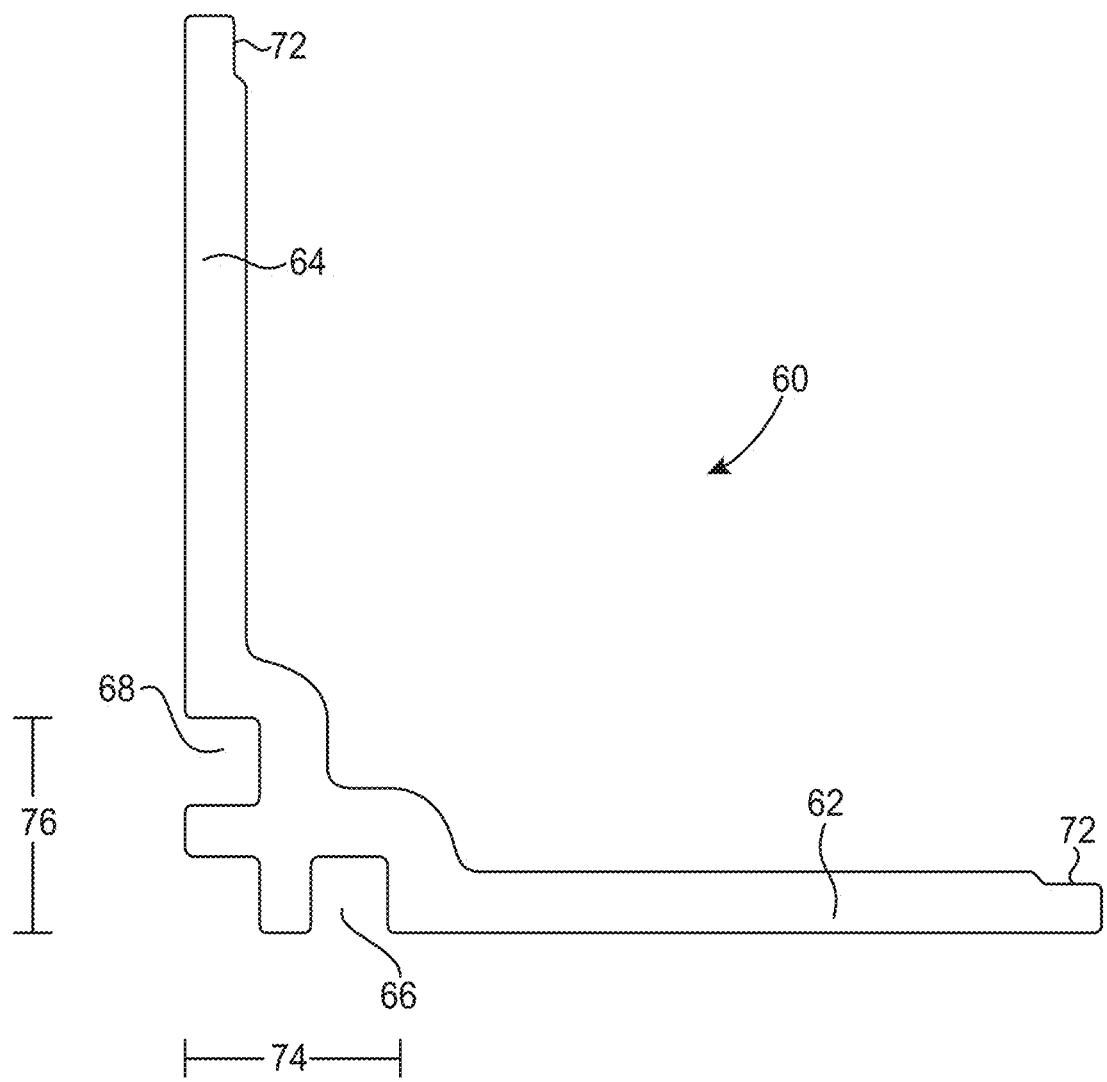
FIG. 4 is an end view of a bracket used with the cable conveyance system according to one aspect of the disclosure.
Figure 6:
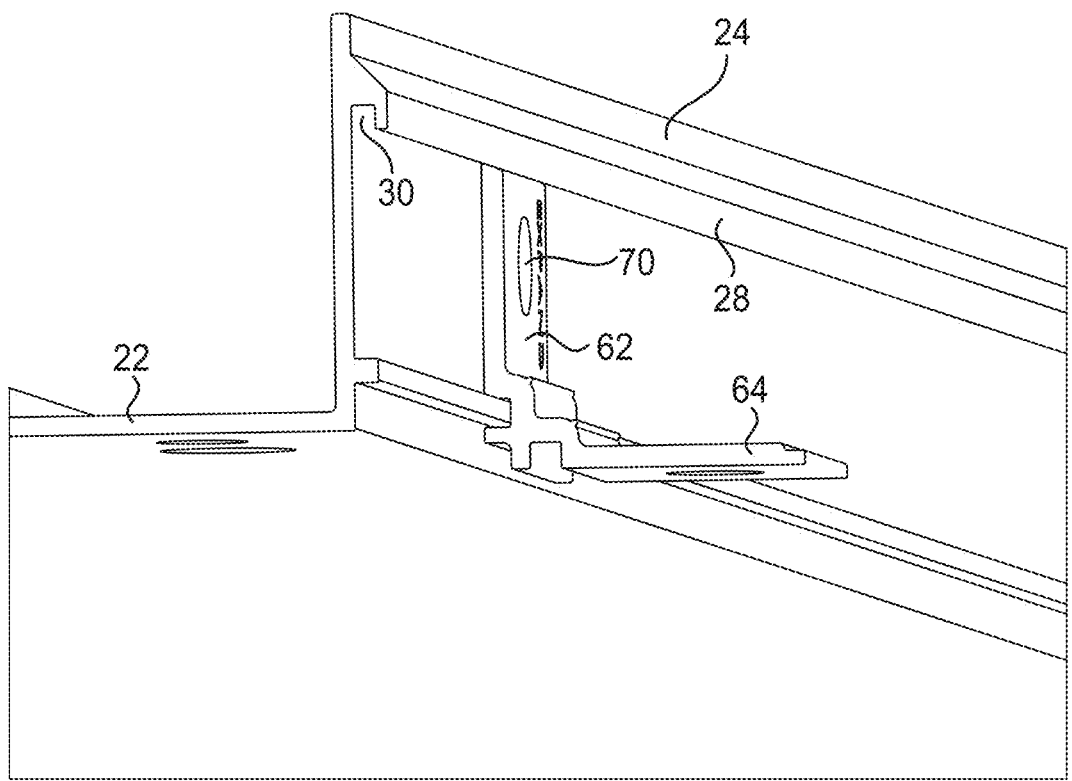
FIG. 6 is perspective view of the bracket of the cable conveyance system arranged in a glide configuration according to a first aspect of the disclosure.

The cable conveyance system 10 may also include one or more generally L-shaped brackets 60 that may be coupled to the exterior surface of one of the sidewalls 24 of the primary tray section 20. Referring to FIGS. 3 and 4, the brackets 60 include a first leg 62 and a second leg 64 of generally equal length. The brackets 10 also include two grooves, including a glide groove 66 cut into the first leg 62 and a hold down groove 68 cut into the second leg 64. The glide groove 66 and the hold down groove 68 may be of varying width, but must be greater than the width of the ridge 26. The first leg 62 and the second leg 64 each include a tapered region 72 on their distal ends. As shown in FIG. 6, the first leg 62 and the second leg 64 include holes 70.

There is one important difference between the glide groove 66 and the hold down groove 68. The distal end of the glide groove 66 (that is, the end located closer to the tapered region 72) is located closer to the distal end of the first leg as compared to the distal end of the hold down groove 68. Thus, the glide distance 74 is greater than the hold down distance 76. In one example, the glide distance 74 may be 0.375 inches, while the hold down distance 76 may be 0.295 inches.

Figure 5:
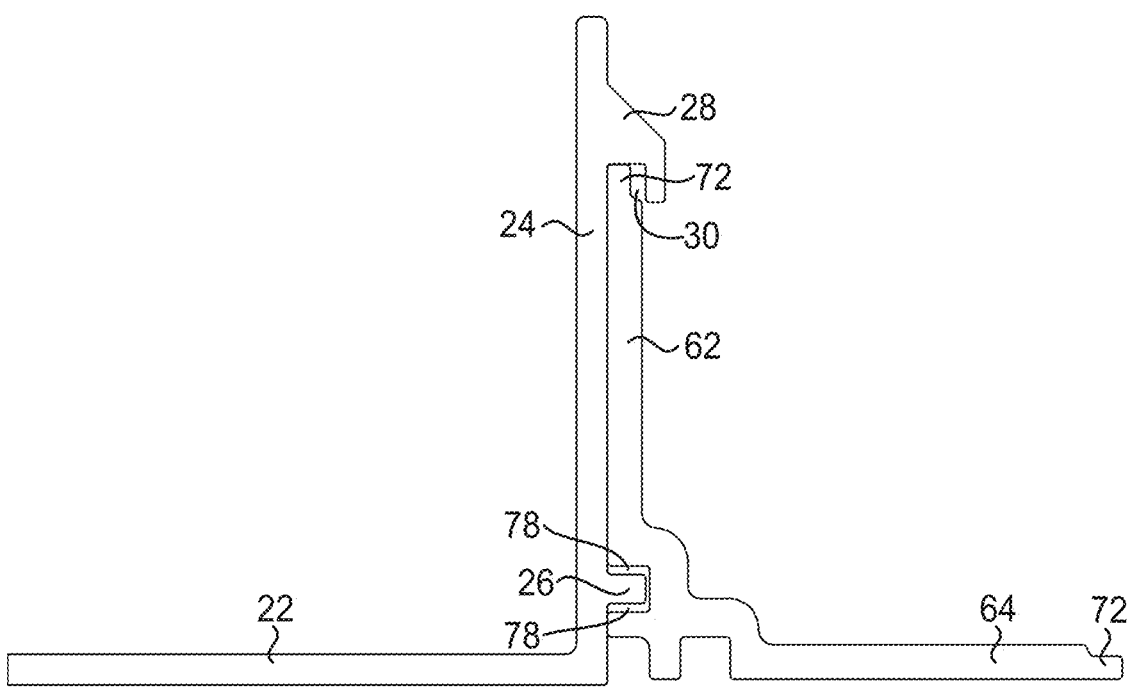
FIG. 5 is an end view of the bracket of the cable conveyance system arranged in a glide configuration according to a first aspect of the disclosure.

The difference in the glide distance 74 and the hold down distance 76 enables the bracket 60 to operate in two different configurations. FIG. 5 illustrates the bracket 60 in a glide configuration in which the first leg 62 is adjacent the sidewall 24 such that the tapered region 72 is within the notch 30 formed by the lip 28. In this glide configuration, the second leg 64 extends away from the sidewall 24. The ridge 26 of the sidewall 24 slides into the glide groove 66. In this glide configuration, there exists a glide opening space 78 between the top of the ridge 26 and the top or distal end of the glide groove 66. When the bracket 60 is clamped to structures or other equipment (for example by placing a screw or bolt through the hole 70 in the second leg 64), the primary tray section 20 may slide within the glide groove 66 to allow movement of the primary tray section 20 in an axial direction parallel to the length of the primary tray section 20 while precluding movement in other directions.

Figure 7:
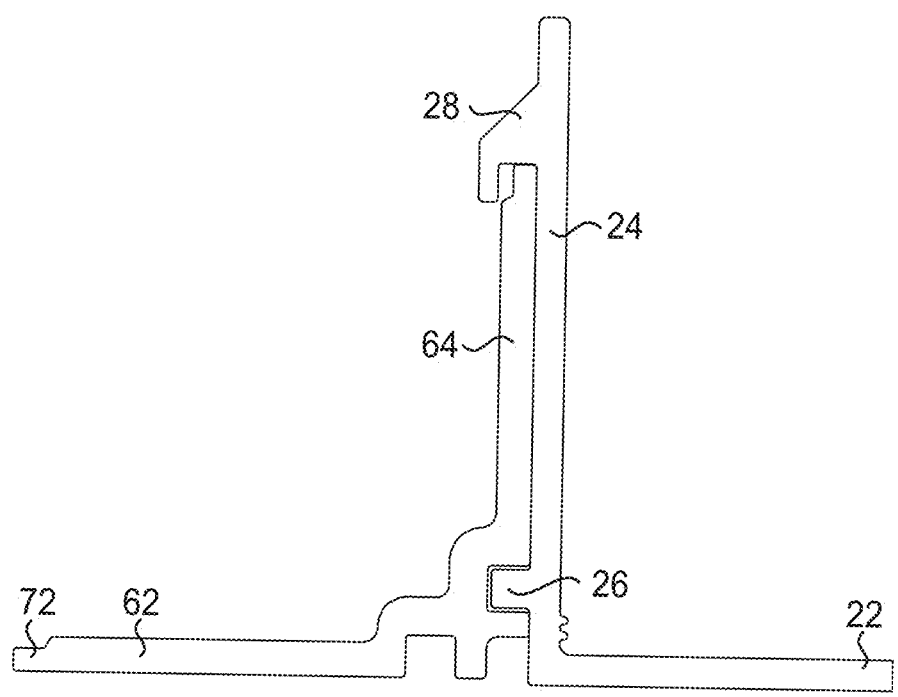
FIG. 7 is an end view of the bracket of the cable conveyance system arranged in a hold down configuration according to a first aspect of the disclosure.
Figure 8:
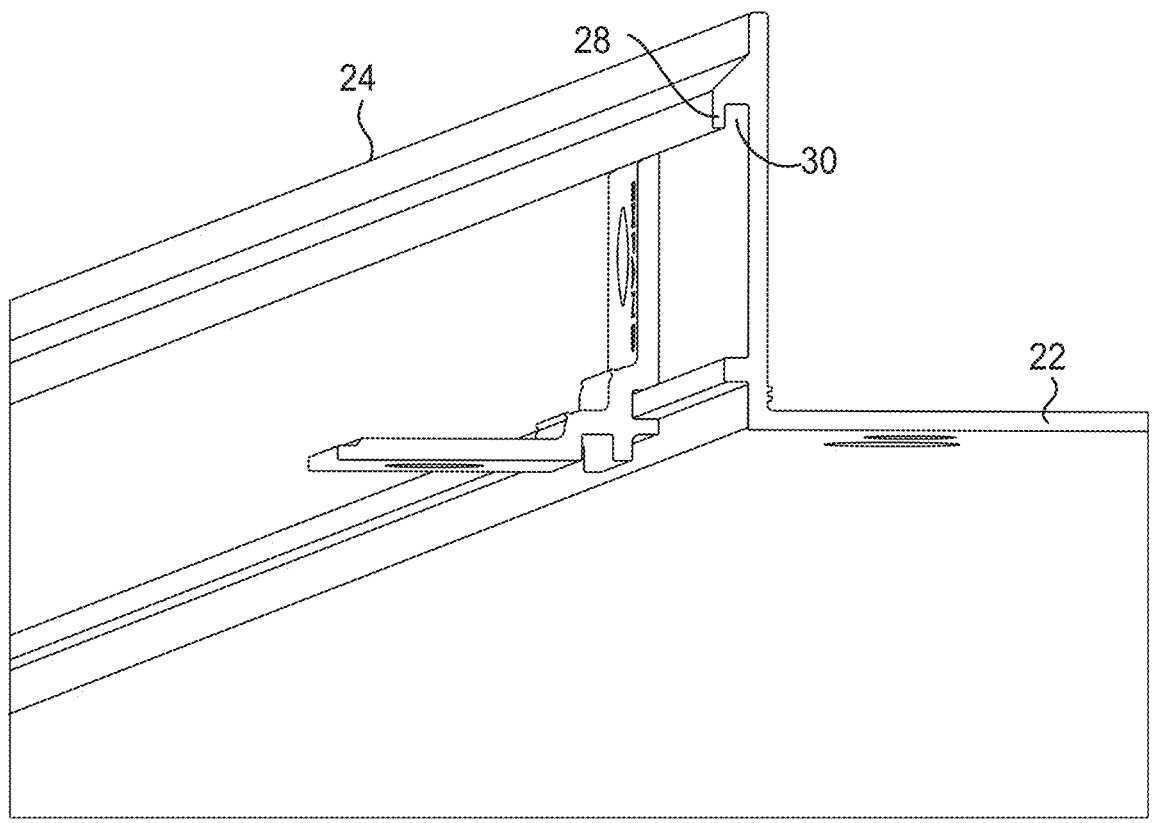
FIG. 8 is perspective view of the bracket of the cable conveyance system arranged in a hold down configuration according to a first aspect of the disclosure.
Figure 9:
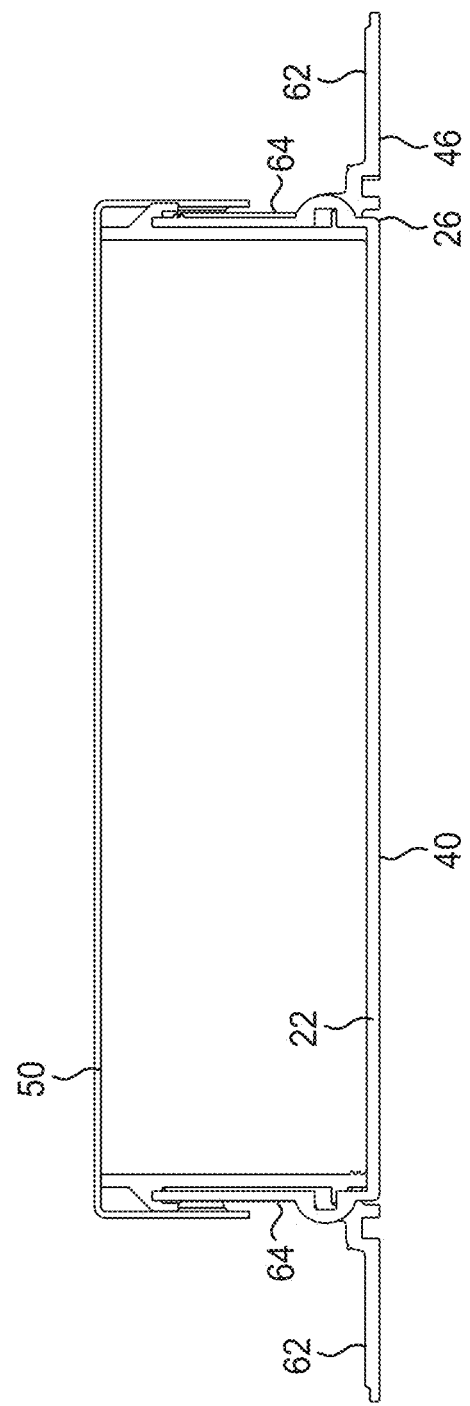
FIG. 9 is an end view of the cable conveyance system.

The bracket 60 may be reversed and placed in a hold down configuration as illustrated in FIG. 7. In this hold down configuration, the second leg 64 of the bracket 60 is adjacent the sidewall 24 such that the tapered region 72 of the second leg 64 is within the notch 30. In this configuration, the first leg 62 extends away from the sidewall 24. The ridge 26 of the sidewall 24 slides into the hold down groove 68. In this hold down configuration, because of the difference between the hold down distance 76 and the glide distance 74, the space between the top of the ridge 26 and the top or distal end of the hold down groove 68 is less than the distance between the top of the ridge 26 and the top or distal end of the glide groove 66 when the bracket is in the glide configuration. In this hold down configuration, when the bracket 60 is clamped to structures or other equipment, the top or distal end of the hold down groove 68 clamps down on the top of the ridge 26 of the primary tray section 20 and retains the primary tray section 20 in a fixed location without allowing movement in the axial direction.

The bracket 60 may be coupled to the sidewall 24 by snapping the bracket 60 into the notch 30 and onto the ridge 26. Alternatively, the bracket 60 may be slid onto an end of the primary tray section 20 into a desired position.

Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:
1. A cable conveyance assembly comprising:
   a primary tray section comprising a horizontal floor having a width and two vertical sidewalls extending upwardly and generally perpendicular to the floor;
      the sidewalls of the primary tray section comprising:
         a ridge on an exterior surface of each sidewall of the primary tray section located proximate the floor of the primary tray section; and a lip located distally from the floor of the primary tray section extending outwardly and downwardly from each sidewall forming a notch spaced outwardly from the exterior surface of each sidewall; and a splice comprising a horizontal floor having a width greater than the width of the floor of the primary tray section, and two vertical sidewalls extending upwardly and generally perpendicular to the floor;

wherein each of the sidewalls of the splice comprises a glide channel formed on an interior surface of each sidewall proximate the floor of the secondary tray section; and wherein the splice may be slideably engaged with the primary tray section such that the ridge of the sidewalls of the primary tray section is aligned with and mates with the glide channel on each sidewall of the splice.

2. The cable conveyance assembly of claim 1 further comprising:

at least one L-shaped bracket for coupling to the exterior surface of at least one of the sidewalls of the primary tray section, the bracket having a first and a second leg of equal lengths;

wherein the first leg of the bracket comprises a glide groove and the second leg of the bracket comprises a hold down groove, wherein each groove is sized to slideably engage with the ridge of the sidewalls of the primary tray section; and wherein the glide groove is spaced further along a length of the first leg than the hold down groove is spaced along a length of the second leg.

3. The cable conveyance assembly of claim 2 in which the bracket may be arranged in a glide configuration wherein the first leg extends into the lip of one of the sidewalls of the primary tray section, the ridge of the sidewall is received in the glide groove, and wherein the second leg extends outwardly from the sidewall of the primary tray section.

4. The cable conveyance assembly of claim 3 wherein the second leg of the bracket comprises a hole for acceptance of a fastener whereby the primary tray may retained to prevent movement in a direction perpendicular to the length of the primary tray while allowing the primary tray to glide in a direction parallel to the length of the primary tray.

5. The cable conveyance assembly of claim 2 in which the bracket may be arranged in a hold down configuration wherein the second leg extends into the lip of one of the sidewalls of the primary tray section, the ridge of the sidewall is received in the hold down groove, and wherein the first leg extends outwardly from the sidewall of the primary tray section.

6. The cable conveyance assembly of claim 5, wherein the first leg of the bracket comprises a hole for acceptance of a fastener, whereby the primary tray may retained to substantially prevent movement in any direction.

7. The cable conveyance assembly of claim 2, wherein the first and second leg of the bracket comprise a tapered region along a distal portion of each leg and wherein the tapered regions are sized to fit within the notch.

8. The cable conveyance assembly of claim 1 further comprising a top cover.

\* \* \* \* \*